Nov. 6, 1928.

E. G. KESLING 1,690,639

GEAR SHIFTING MECHANISM

Filed Feb. 1, 1924

WITNESSES
Louis Goodman
E. N. Lovewell

Elmer G. Kesling
INVENTOR

BY

ATTORNEY

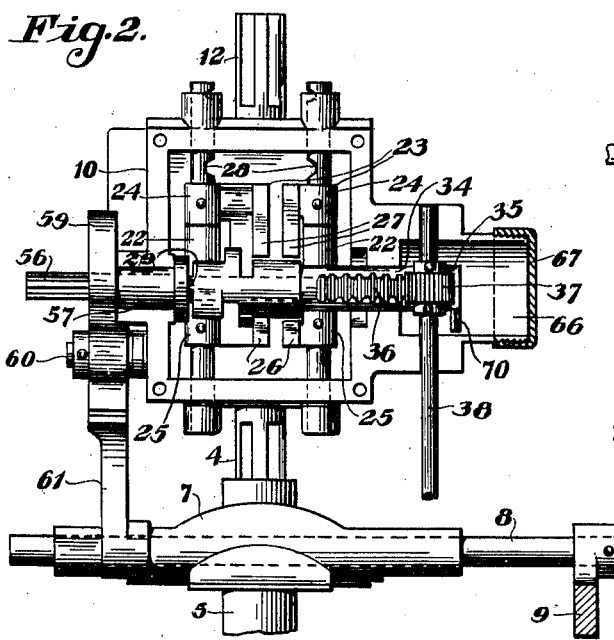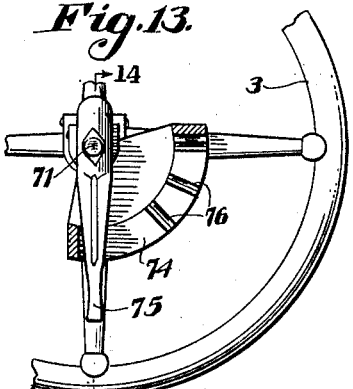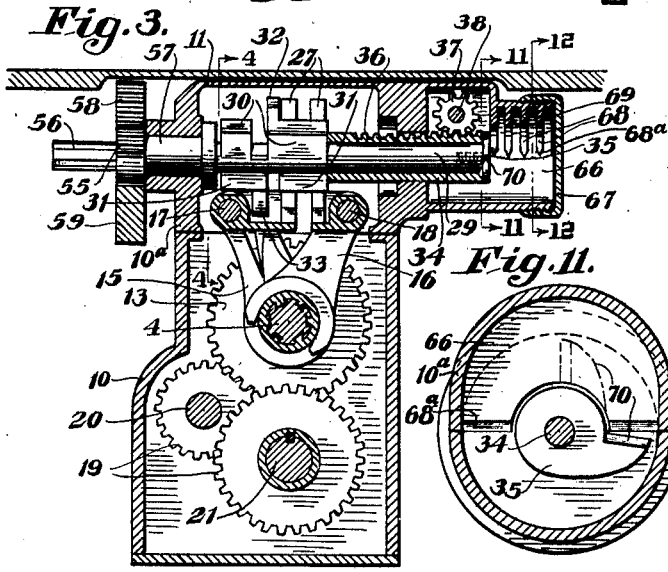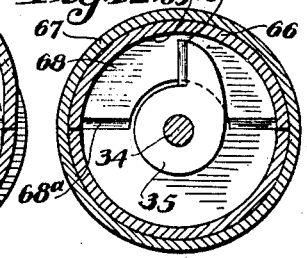

Nov. 6, 1928.                                                1,690,639
E. G. KESLING
GEAR SHIFTING MECHANISM
Filed Feb. 1, 1924          3 Sheets-Sheet 3

Elmer G. Kesling
INVENTOR

WITNESSES
Louis Goodman
E. N. Lovewell

BY

ATTORNEY

Patented Nov. 6, 1928.

1,690,639

UNITED STATES PATENT OFFICE.

ELMER G. KESLING, OF BLOOMFIELD, NEW JERSEY.

GEAR-SHIFTING MECHANISM.

Application filed February 1, 1924. Serial No. 689,990.

This invention relates to an improvement in gear shifting mechanism, which is particularly adapted to be used for shifting transmission gearing of the slidable type, such as is commonly used on motor driven vehicles.

The general object of the invention is to provide a practical mechanism for this purpose, which is simple in its construction, yet strong and durable, which may be easily operated, and which is positive in its action.

The device is so constructed that it may be connected with the usual clutch operating rod, and operated in conjunction with the clutch in the proper sequence without any of the difficulties or possibility of damage, which often result when the clutch and shifting levers are operated independently.

In connection with the gear shifting mechanism, means are provided, preferably in the form of a lever on the steering column, for positively selecting the desired combination or ratio of gearing, which will be rendered operative upon depression of the clutch pedal. A single controlling member or selector shaft, adapted to be actuated by the aforesaid selecting means, is mounted between collars rigidly connected with the gear shifting yokes, and is moved longitudinally by the selecting means preparatory to the gear shifting operation. It is then partially rotated about its longitudinal axis by the action of the clutch operating mechanism during the latter part of its movement. Both the selection and operation of the gear shifting mechanism are positive. No springs are relied upon to do any part of the shifting.

A further important feature of the invention is that the positions of the selecting lever are distinctive, particularly the reverse position, so that there can be no mistake or uncertainty in positioning the selecting lever, so that the desired shift will be effected.

The invention consists further in various details of construction and combinations of elements, which will be more clearly understood from the following detailed description, which is to be read in connection with the accompanying drawings forming a part hereof.

In the drawings:

Figure 2 is a plan view of the selecting mechanism, showing its relation to the gear shifting yokes, and to the clutch operating mechanism.

Figure 3 is a section taken transversely through the transmission casing, and showing the relation of the selector shaft to the gear shifting yokes.

Figures 8, 9, 10:
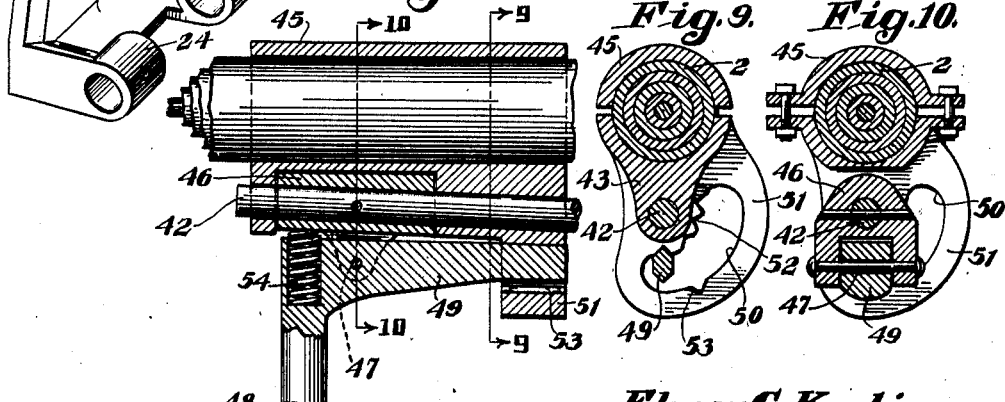
Figure 8 is a vertical section through the selector actuating means, which is secured to the steering column.

Figures 9 and 10 are detail sectional views taken on the lines 9—9 and 10—10, respectively, of Figure 8.

Figure 11 is a detail sectional view taken on the line 11—11 of Figure 3, showing the means for locking the selector shaft against longitudinal movement during the shifting operation.

Figure 12 is a detail sectional view taken on the line 12—12 of Figure 3, with the selector shaft in a different position.

Figure 13 is a fragmentary view of the steering wheel, with a modified form of selector actuating mechanism connected therewith.

Figure 14 is a detail sectional view taken on the line 14—14 of Figure 13.

Figure 15 is a detail sectional view taken on the line 15—15 of Figure 14.

Figure 1:
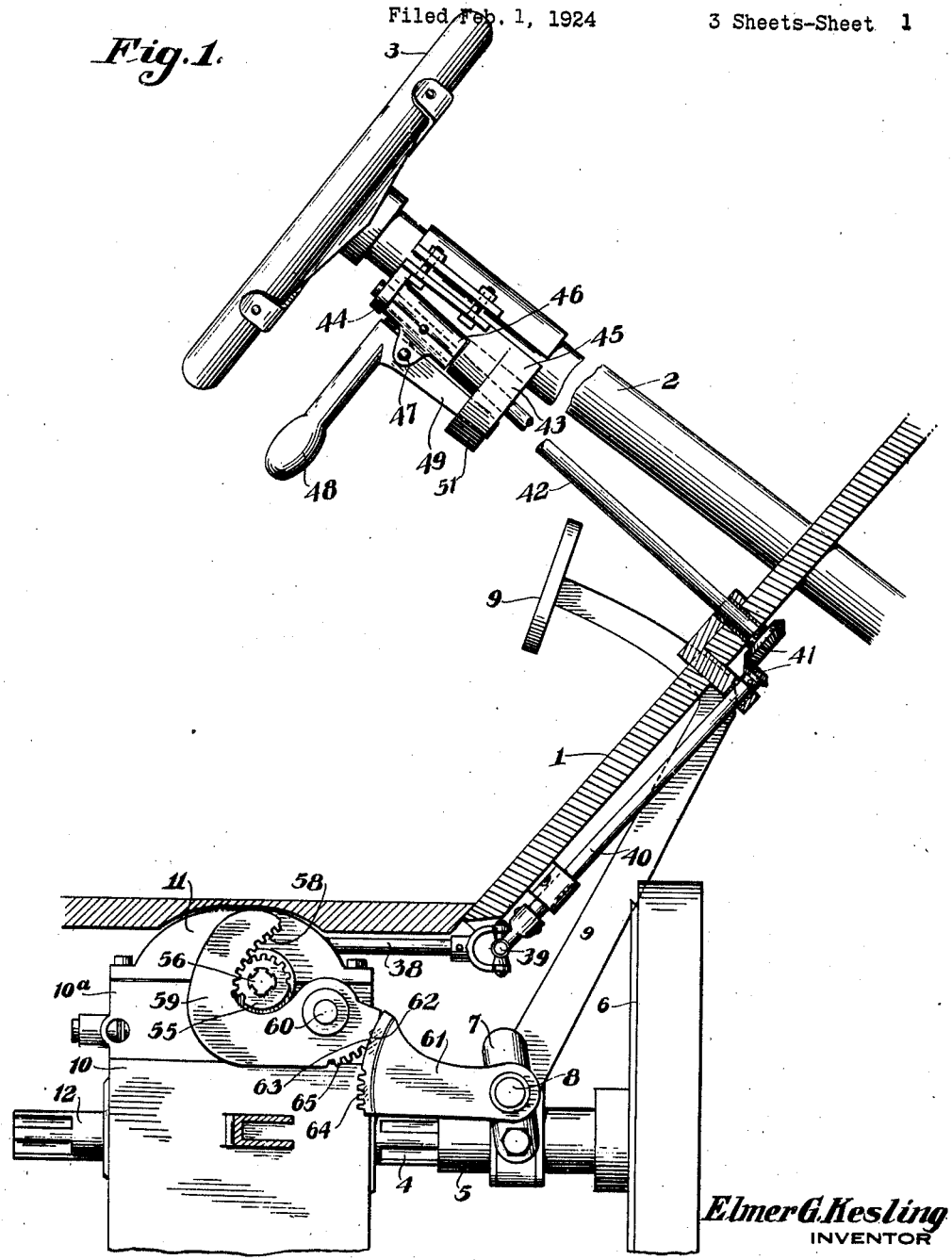
Figure 1 is a side elevation of the invention as applied to a motor vehicle, with a portion of the vehicle being shown in section.
Figure 4:
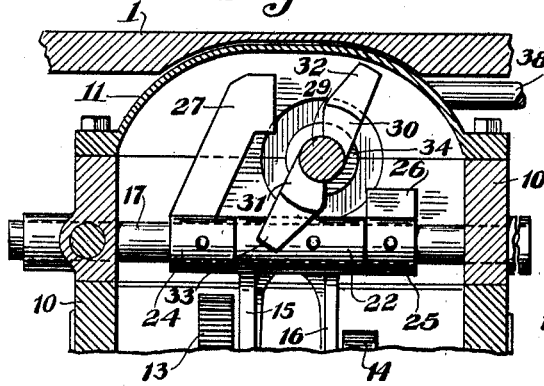
Figure 4 is a detail sectional view taken on the line 4—4 of Figure 3.
Figure 5:
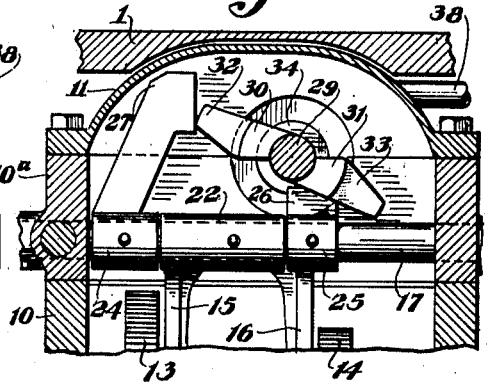
Figure 5 is a similar view, showing the selector shaft in a different position.
Figure 6:
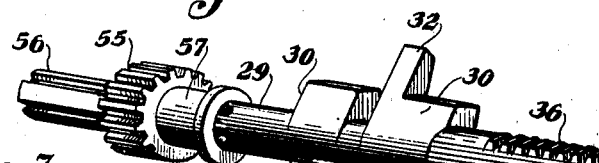
Figure 6 is a detail perspective view of the selector shaft.
Figure 7:
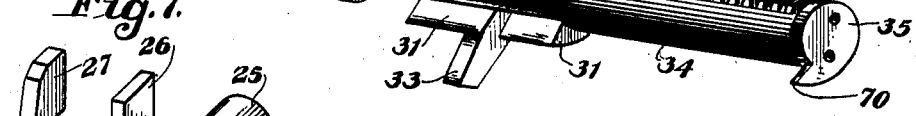
Figure 7 is a detail perspective view of one of the brackets cooperating with the selector shaft to shift the gears.

The invention is shown in connection with a portion of a motor vehicle which comprises a body 1, and steering column 2, at the upper end of which is the steering wheel 3. Underneath the body 1, there is shown a main drive shaft 4 on which is splined a sleeve 5, connected with the movable member of a clutch 6, and actuated to connect or disconnect the clutch by means of a yoke 7 secured to a rock shaft 8, and operated by means of a pedal lever 9. The rear end of the drive shaft 4 extends into the transmission casing 10, which is provided with an upward extension 10ª, closed by a removable cover 11. The pinion shaft 12 extends into the transmission casing 10 from the rear side in alinement with the main drive shaft 4, and is adapted to be operatively connected with the latter by means of one of the slidable transmission gears 13 and 14, which are of the usual type, and arranged in the manner shown in Figures 3, 4 and 5. Gear shifting yokes 15 and 16 are operatively connected to the hubs of the slidable gears 13 and 14, respectively, and are adapted to be moved selectively in either direction to effect the desired combination or ratio of gearing, in connection with the transmission gears 19 mounted on countershafts 20 and 21, within the transmission casing 10. This type of transmission is well known, and a detailed description thereof is unnecessary.

The yokes 15 and 16 are supported on shafts 17 and 18, respectively, which are mounted in the upward extension 10ª of the transmission casing 10. Each yoke is secured to its respective shaft by means of a sleeve 22, and a bracket 23 is also secured to the shaft by means of integral collars 24 and 25, arranged at opposite ends of the sleeve 22, and rigidly connected to the shaft 17 or 18, as the case may be, and consequently is in rigid relation to the corresponding yoke 15 or 16. Each bracket is provided with upstanding projections 26 and 27, which are selectively engageable by means hereinafter described to move the shaft 17 or 18 longitudinally in either direction, and thereby to move the corresponding yoke 15 or 16 to shift the gears. Each of the shafts 17 and 18 is provided with the usual notches 28, which are yieldably engaged by the usual plunger locks to retain the transmission gears in the position to which they have been shifted.

The means for selectively engaging the projections 26 and 27 for actuating the shafts 17 and 18, includes a selector shaft 29 arranged above and transversely of the shafts 17 and 18, and between the projections. This selector shaft has formed thereon neutral surfaces 30 and 31, which, when in position to engage the upstanding projections 26 and 27, maintain the corresponding shafts 17 and 18 in neutral position, and active shift producing projections 32 and 33, which, when they are in position to engage the upstanding projections 26 and 27, move the corresponding shaft 17 or 18 in a direction to effect the shift which has been selected. As will be clearly understood from Figures 2 and 3, the selector shaft 29 is adapted to be moved longitudinally to bring the selected surfaces 32 or 33 into the plane of the selected projections 26 and 27, so that upon subsequent rotational movement of the shaft 29, the yokes, if previously selectively positioned, will be first placed into neutral position by one or the other of the surfaces 30 or 31, and then a selected one of the shafts 17 or 18, with its yoke 15 or 16, will be moved in one direction or the other as may be determined upon, while the other yoke is held against movement by the surfaces 30 and 31.

The means for shifting the selector shaft longitudinally, includes an elongated sleeve 34 mounted on one end of the shaft, and held thereon by a head 35 secured to the extremity of the shaft. The shaft 29 is freely rotatable within the sleeve 34, while the latter is held against rotational movement by a longitudinal series of teeth 36, which are in engagement with a pinion 37 secured to the rear end of the selector actuating shaft 38. By rotation of the shaft 38, therefore, the sleeve 34 is moved longitudinally with the selector shaft 29, while leaving the latter free to rotate for subsequently shifting the gears.

In accordance with the construction shown in Figures 1, 8, 9 and 10, the forward end of the selector actuating shaft 38 is connected by a universal joint 39 with an upwardly inclined shaft 40, which is connected by beveled gears 41 with a shaft 42 extending upwardly alongside the steering column 2, and having its upper end journaled in gears 43 and 44, projecting from a split sleeve 45 secured to the steering column. A sleeve 46 is secured to the shaft 42 between the ears 43 and 44, and is provided with a pair of ears 47, between which is pivotally mounted a pawl 48. This pawl has a downwardly projecting arm 49, which extends into an arcuate loop 50 formed in a rearward projection 51 of the ear 43, and provided on one side with a series of notches 52 corresponding to neutral low, intermediate and high gear, and on its opposite side is a notch 53, corresponding to reverse gear. A suitable spring 54 is preferably provided to retain the arm 49 in engagement with any one of the notches 52, while if it is desired to retain the pawl in reverse gear position, that is, in engagement with the notch 53, this must be done manually against the resistance of the spring 54. By arranging the several notches in this manner, there is no possibility of mistaking the reverse gear notch for one of the forward drive notches, and when the selecting mechanism is set for one of the forward drives there is no possibility of its becoming accidentally displaced.

It is to be understood that preparatory to shifting gears, the selecting pawl 48 is engaged with a notch 52 or 53 corresponding to the gear selected, and the movement of the pawl to this position partially rotates the shafts 42, 40 and 38, and moves the selector shaft 29 longitudinally into such position that when rotated any selected one of the projections 26 or 27 will be engaged by one of the projections 32 or 33 to move one of the yokes 15, 16 in one direction or the other to effect the desired combination of gearing, while the other yoke is held stationary by the surfaces 30 and 31. The means for effecting the partial rotation of the selector shaft 29 may only be actuated through the medium of the clutch operating lever 9 during the latter part of its downward movement after the clutch has been disconnected. For this purpose, a pinion 55 is splined to the end portion 56 of the selector shaft 29, and is provided with a flanged sleeve 57 to retain it against longitudinal movement when the shaft 29 is shifted longitudinally. Teeth may also be provided throughout a portion only of the circumference of the pinion 55, in order to prevent the same from rotating too far. The teeth of the pinion 55 are in mesh with an internal gear segment 58 formed on the concave side of the curved arm 59, which is pivoted on a stud 60 supported on the gear casing 10. This curved arm 59 is rocked by means of a sector 61 secured to the shaft 8, on which the clutch yoke 7 is mounted. The upper portion of the sector 61 is provided with a smooth delay portion 62, which intially slips on the concave surface 63 of the arm 59, so that the latter remains stationary during the initial part of the downward movement of the clutch lever 9. When the lever 9, however, is moved downwardly a sufficient distance to disengage the clutch 6, the teeth 64 on the lower portion of the sector 61 will engage the teeth 65 on the curved arm 59 and rock the latter, and thereby partially rotate the shaft 29 to operate the selected shift.

It has been noted that in the operation of some gear shifting devices, the selector shaft, after the proper selection of gears has been made, sometimes becomes displaced, or sometimes the selector mechanism has not been positioned with sufficient accuracy, so that upon actuation of the shifting mechanism, the wrong shift is effected, which causes the operator to become confused and often to loose control of the vehicle. In order to prevent such a possibility, I have in the present invention provided the head 35 with a knife edged projection 70, and the upper portion of the gear casing is provided with a cylindrical extension 66, which may be closed by a cap 67 and into which the head 35 is projected when the selector shaft 29 is moved away from neutral position. The upper portion of this extension 66 is provided with a series of internal ribs 68, formed knife edged on their lower ends at 68$^a$, alternating with grooves 69, corresponding to the several operative positions of the selector shaft. When the selector shaft is initially positioned, therefore, to select the desired shift, and the shaft is then rotated to effect the shifting operation, even though the initial positioning may not be quite accurate the knife edged projection 70 will nevertheless be guided by the beveled edges 68$^a$ into the corresponding groove 69, so as to accurately rectify the position of the shaft 29 longitudinally for the shift selected, and then positively lock the same in that position, thus preventing any mistake or uncertainty in the shifting operation.

In the modified selector actuating mechanism, shown in Figures 13, 14 and 15, a rock shaft 71 is mounted within a sleeve 72, which extends downwardly within a tubular steering shaft 73. The sleeve 72 is fixed in any suitable manner to the frame of the vehicle, and has secured to its upper end an arcuate loop 74 through which extends a pawl 75, which is pivoted to the upper end of the shaft 71. One side of the loop 74 is provided with slots 76, as shown in Figure 13, corresponding to neutral, low, intermediate and high gear, and the opposite side of the loop is provided with a notch 77 corresponding to reverse gear. The pawl 75 is normally urged in one direction, in the same manner as in the construction shown in Figure 8, by means of a coiled spring 78 acting between a socket in the rear end of the pawl 75, and a corresponding socket in a member 79 secured in fixed relation to the shaft 71.

From the foregoing description, it will be understood that whenever it is desired to effect a shifting of gears, the pawl 48 or 75, as the case may be, is moved to the notch corresponding to the combination of gears desired. This movement through the medium of the shafts 42, 40 and 38 and the pinion 37 and rack 36, moves the selector shaft 29 longitudinally into such position that when rotated, the arm 32 or 33 and the surfaces 30 or 31 will engage the corresponding projections 26 or 27 to effect the desired change to low, intermediate, higher reverse gear, or to neutral position, depending upon the position in which the selector pawl is set. Perfect alinement of the various selections is insured by the knife-edged projection 70, which is secured to the end of the selector shaft 29, and engages the groove 69 corresponding to the selection. The clutch is disconnected and the gears shifted all by a continuous movement of the lever 9. The mechanism is positive in its operation, and accurate in its results. There is no possibility of setting the mechanism for a shift to reverse gear when one of the other shifts is desired. It will also be noted that the shifting mechanism is exceptionally compact, due to the novel shape and relative arrangement of the various parts. The shifting yoke shafts are placed just far enough apart to be always out of the way of the swing of the arms 32, and the selector shaft 29 is placed as close to the yoke shafts 17 and 18 as the neutralizing surfaces 30 and 31 will permit. Also the working surfaces of the projections 26, when shifted toward the rear may go to the vertical center line and just under the selector shaft 29, while the projections 27 may move forward to the same line, but just over the shaft 29.

While I have shown and described with considerable detail the specific construction representing the present embodiment of the invention, it is to be understood that this is merely illustrative, and that many modifications may be made in the size, shape and relative arrangement of the various elements without departing from the salient features of the invention, or sacrificing any of its advantages.

What is claimed is:

1. In a gear shifting mechanism, the combination with a plurality of shiftable elements, of a selector shaft movable longitudinally to select the shift desired and partially rotatable to complete the shift, a rockable element geared to the selector shaft to effect the partial rotation thereof, and a clutch lever having a delay gear connection with said rockable element, whereby the selector shaft is rotated only during the latter part of the movement of said lever.

2. In a gear shifting mechanism, the combination with a plurality of shiftable transmission gears, of a selector shaft movable longitudinally to select the shift desired and partially rotatable to complete the shift, a casing within which said gears are supported, said selector shaft extending at one end beyond the casing and having a pinion slidably splined thereto outside the casing but held against longitudinal movement when the selector shaft is moved longitudinally, a rock arm pivoted to the outside of the casing and having at one end a gear segment formed thereon and in mesh with said pinion, and a clutch lever having a delay gear connection with the other end of the rock arm, whereby the selector shaft is rotated only during the latter part of the movement of said lever.

3. In a gear shifting mechanism, the combination with a plurality of shiftable transmission gears, of a selector shaft movable longitudinally to select the shift desired and partially rotatable to complete the shift, a rockable element geared to the selector shaft to effect the partial rotation thereof, a clutch lever having a delay gear connection with said rockable element, whereby the selector shaft is rotated only during the latter part of the movement of said lever, and means for positively locking the selector shaft against longitudinal movement while it is being rotated.

4. In a gear shifting mechanism, the combination with a plurality of shiftable elements, of a selector shaft movable longitudinally to select the shift desired and partially rotatable to complete the shift, a pinion slidably splined to the selector shaft but held against longitudinal movement therewith, a rock arm having at one end a gear segment in mesh with said pinion, a clutch lever having a delay gear connection with the other end of the rock arm, whereby the selector shaft is rotated only during the latter part of the movement of said lever, and means for positively locking the selector shaft against longitudinal movement while it is being rotated.

5. In a gear shifting mechanism, the combination of a transmission casing, a plurality of selectively shiftable transmission gears contained therein, a selector shaft movable longitudinally to select the desired shift and partially rotatable to complete the shift, a cylindrical extension to the casing into which one end of the shaft projects when moved longitudinally, that end of the shaft having a laterally projecting knife edge, and a series of segmental ribs on the inner end of the cylindrical extension forming grooves which correspond to the respective selective positions of the shaft, and which receive said knife edge during the partial rotation of said shaft to positively prevent longitudinal movement of the shaft during the completion of the shifting operation.

6. In a gear shifting mechanism, the combination with a plurality of shiftable gears, of a selector shaft movable longitudinally to select the shift desired and partially rotatable to complete the shift, a rockable element geared to the selector shaft to effect the partial rotation thereof, a clutch lever having a delay gear connection with said rockable element, whereby the selector shaft is rotated only during the latter part of the movement of said lever, said selector shaft having at one end a laterally projecting knife edge, and a cylindrical housing embracing that end of the shaft and having a series of internal segmetal ribs forming grooves corresponding to the respective selective positions of the shaft, and which receive said knife edge during the partial rotation of said shaft to positively prevent longitudinal movement of the shaft during the completion of the shifting operation.

7. In a gear shifting mechanism, the combination of a transmission casing, a plurality of transmission gears contained therein, a plurality of shafts mounted for longitudinal slidable movement above said gears, yokes fixed to said shafts and operatively connected to the gears for shifting the same, a bracket secured to each of said shafts and having upstanding projections, a selector shaft mounted transversely above said first-mentioned shafts, said selector shaft being shiftable longitudinally and partially rotatable to engage selected projections to effect the shifting operation, a clutch lever having a delay gear connection with said selector shaft, whereby the latter is rotated only during the latter part of the movement of said lever, a cylindrical extension to the transmission casing into which one end of the selector shaft projects when shifted, that end of the shaft having a laterally projecting knife edge, and a series of segmental ribs on the inner surface of said cylindrical extension forming grooves which correspond to the respective selective positions of the shaft, and which receive said knife edge during the partial rotation of the selector shaft to positively prevent longitudinal movement of the same during the completion of the shifting operation.

8. In a gear shifting mechanism, the combination of a transmission casing, a plurality of transmission gears contained therein, means for shifting said gears selectively, a selector shaft movable longitudinally to select the shift desired and partially rotatable to complete the shift, a pinion slidably splined to the selector shaft but held against longitudinal movement therewith, a rock arm having at one end a gear segment in mesh with said pinion, a clutch lever having a delay gear connection with the other end of the rock arm, whereby the selector shaft is rotated only during the latter part of the movement of said lever, a cylindrical extension to the casing into which one end of the shaft projects when shifted longitudinally, that end of the shaft having a laterally projecting knife edge, and a series of segmental ribs on the inner surface of the cylindrical extension forming grooves which correspond to the selective positions of the shaft, and which receive said knife edge during the partial rotation of the shaft to positively prevent longitudinal movement of the same during the completion of the shifting operation.

9. In a gear shifting mechanism, the combination of a plurality of selectively shiftable transmission elements, a selector shaft shiftable longitudinally to select the required gear combination and rotatable to complete the gear shift, means for shifting said selector shaft including a rockable shaft, a spring pressed pawl connected with said rockable shaft, a member cooperating with said pawl and having notches engageable by the pawl to determine the position of the selector shaft for shifting to neutral, low, intermediate, high and reverse gear, said notches being so disposed that the pawl is urged by its spring into engagement with either of said notches except the reverse notch, said reverse notch being so located that the pawl must be forced thereinto in opposition to said spring.

10. In a gear shifting mechanism, the combination of a plurality of selectively shiftable transmission elements, a selector shaft shiftable longitudinally to select the required gear combination, means for shifting said shaft including a rockable shaft, a spring pressed pawl connected with said rockable shaft, a segmental loop in cooperative relation to said pawl and having on one side notches corresponding to neutral, low, intermediate and high gear into any of which the pawl is urged by its spring, and having on its opposite side a notch corresponding to reverse gear into which the pawl must be forced in opposition to its spring.

In testimony, that I claim the foregoing as my own, I have hereto affixed my signature.

ELMER G. KESLING.